April 17, 1956  G. A. BRONSON ET AL  2,742,564
WIDE ANGLE ILLUMINATING FIXTURE
Filed Feb. 23, 1952
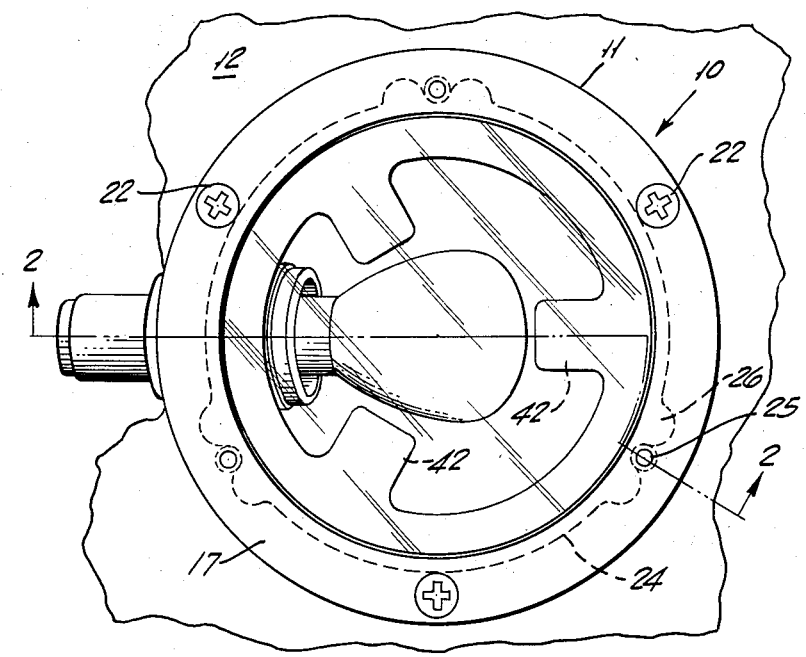
INVENTORS
GEORGE A. BRONSON AND
HARLAN E. PITCHER
BY Edwin Coates
ATTORNEY United States Patent Office 2,742,564
Patented Apr. 17, 1956

2,742,564
WIDE ANGLE ILLUMINATING FIXTURE

George A. Bronson, Santa Monica, and Harlan E. Pitcher, Los Angeles, Calif., assignors to Douglas Aircraft Company, Inc., Santa Monica, Calif.

Application February 23, 1952, Serial No. 273,056

1 Claim. (Cl. 240—7.7)

This invention relates to lighting fixtures, particularly those for indicating the position or attitude of vehicles carrying same.

It is an object of the invention to provide a lighting fixture of this type which, by means of a novel lens and its relationship to the light source or lamp therein, can be mounted in a surface of the vehicle with its exterior, spherically outwardly refracting surface substantially flush with the exterior of the vehicle's mounting surface. Thus, very little, if any, of the fixture protrudes from the mounting surface, so that when the fixture is mounted on an airplane, for example, very little aerodynamic drag will be caused thereby, yet illumination will be obtained therefrom throughout substantially 180° of arc in the planes extending outwardly at 90° to the exterior surface of the lens of the fixture and occupying 360° of arc in a plane substantially parallel to the adjacent surface of the vehicle. Since the outermost surface of the fixture, which surface is the exterior surface of the lens, protrudes very little from the adjacent surface of the vehicle, the amount of frangible material exposed to danger of damaging impact is reduced to the minimum.

Another object of the invention is to provide a fixture of this type which, by means of a unirefrangent lens having opposed spherical faces the inner one of which is concentric with the light source and therefore effects no refraction of the light rays entering same from the light source, will be able to illuminate a region extending from edge to edge vertically outwardly of the carrying surface and 360° around the fixture without the use of compound lens-surfaces, or tort or warped refractive surfaces. By these means, the cost of making the lens and the rest of the fixture is reduced considerably below that of a conventional such fixture of the same size and candlepower, since the entire lens can be cast, instead of requiring expensive grinding or other extra working of at least the outer surface of the lens to provide a refractive surface to correct the refraction effected at the conventional inner surface of the ordinary such lens and bend the light through 180°, edge-to-opposite-edge, of the outer lens surface.

The other objects and advantages of the invention will either become apparent or be made manifest as this disclosure progresses.

One of the presently-preferred embodiments of these and other inventive concepts is illustrated, by way of example only, in the accompanying drawings and will be described hereinafter in conjunction therewith. Although the invention is shown and described as embodied in an airplane as a wing-mounted position indicating light, it will become apparent hereinafter that the invention is equally well adapted for employment in other vehicles in other lights than position-indicating lights. For example, it may be employed in automobile tail lights, in truck warning lights, and for all other uses where wide angle illumination is desirable.

In these drawings:

Figure 1 is a top plan view of a portion of an airplane wing carrying one of the present fixtures mounted substantially flush with its upper surface; and Figure 2 is a section on line 2—2 of Figure 1.

The construction shown in the drawings comprises an illumination-unit, or wing tip light, 10, sunk in an opening 11 provided in an airplane wing-tip skin 12. The inner edge of the opening is encircled by an annular flange 13 on which rests the complementary annual flange 14 of the body 15 of the lighting fixture. Upstanding from the outer edge of flange 14 is an annular support-rim 16. A clamping ring 17, annularly rabbeted as shown at 18, and 19 to provide annular clamping shoulders at its inner and outer peripheries, is seated by means of the outer rabbet 18 on the rim 16. The inner clamping shoulder provided by the rabbet 19 of the clamping ring engages in an annular groove 21 on the upper outer periphery of the outermost face of the lens. Packing 41 may be interposed as shown. The clamping ring is held in its engagement with the lens, to maintain the latter in place, by means of fasteners 22, such as self-tapping screws, which thread into the annular rings or flanges 13 and 14 at the opening in the wing's skin.

A lens support, or retainer ring 24, here shown as a concavo-convex metallic annulus or open-center plate, is provided for the purpose of supporting the lens against the inward pull of the fasteners. As shown in plan in Figure 1 the inner periphery of retainer ring 24 is provided with a plurality of radially inwardly extending ears 42 located 120° apart peripherally, no ear therefore being disposed at the lamp side of the fixture, in order not to interfere with the lamp housing. The rtainer ring is held to the clamping ring and against the lens by means of plurality of fasteners 25 the heads of which engage ears 26 extending radially outwardly from the outer periphery of the retainer.

The housing 15 is of a generally hemispherical shape for compactness and ease of fabrication. The one portion, 27, of the wall of the body is planeal and extends at an obtuse angle to the bottom of the housing. In said portion is an aperture 28 through which passes a member 29 abutted against the outer surface of wall 27 by means of an annular shoulder 31. A retaining ring 32, inserted in an annular groove 33, on the inner end portion of the socket, cooperates with the shoulder 31 to maintain member 29 in place. Mounted coaxially of member 29 is an electrical socket member 34 terminating at the outer end portion of member 29 in a pair of contact prongs 35 adapted for coaction with the plug of an electrical lamp-energizing circuit, not shown. Member 34 bears the usual spring contact 36 for an electric lamp or bulb 37 mounted coaxially therein. The outer end of the socket is seized by annular peening 38. The lamp 37 is so constructed and mounted in the socket to extend across the vertical center line of the housing 15.

The lens component of the fixture consists of an outwardly light-diverging, unirefrangent article 39 which has no compound, warped, tort or rectilinear refractive surfaces. Instead, both the inner surface 44 which does not refract, and the sole refractive surface, which is outer surface 45, are simple, continuous uninterrupted surfaces which here are exemplified as portions of the surfaces of spheres. As shown, the light-diverging, unirefrangent lens assumes the form of a concavo-convex, double meniscus lens, and an important feature of the invention is that the concave surface 44 confronts the optical center of the lamp equidistantly at substantially all points of the surface. As shown, the inner surface is a substantial portion of the surface of a sphere the center of which lies at the center 49 of the lamp's filament. Thus all the rays from the latter strike surface 44 at right angles to the tangents thereto, instead of impinging on said surface obliquely. Hence, no refraction occurs as the light passes into the body of the lens from the air inside the housing. Thus, no refraction has to be corrected as the light passes from the inner surface 44 to surface 45 or from the lens' outer surface 45 to the air, where occurs the only refraction undergone in the lens.

Since the preferred form of lens is composed of "Pyrex" glass with a relatively high index of refraction, thereby deflecting peripheral rays to horizontal, and since the lens is unirefrangent with the light source located at the geometrical center of the inner surface 44, the outer face of the lens can be made to consist of a portion of the surface of a sphere of relatively large radius not concentric with surface 44. The expensive grinding, and other maching operations incident to the conventional use of warped, tort or other compound surfaces for the surface 45 are hence obviated, yet the rays from the light source are directed outwardly from surface 45 through an arc of 180°, that is the emitted light extends around from horizon to horizon, as it were. It is also emitted all around the 360° periphery of the outer surface.

Since thus the outer surface 45 can be made almost planeal, it does not protrude substantially from the adjacent surface of the supporting structure. Drag and liability of damage by impact are thus reduced to a minimum because of its smoothness and very slight protrusion.

Although the inventive concepts have been described in detail in connection with their embodiment as a position-indicating light for mounting in an airplane wing, it should now be apparent that by means of slight modifications not departing from the spirit and scope of the invention, it may be used in any environment where an improved wide angle flush-type illuminating unit is desirable. Accordingly, the scope of the sub-joined claim is not to be limited to the embodiment illustrated and described herein by way of example.

We claim:

A vehicle lighting fixture, comprising: an open-face housing having a conformation adapting it to fit inside an opening through a substantially flat supporting structure with its open face directed outwardly of said opening, the open face of said housing being peripherally bounded by an outwardly angled, upstanding flange; a cupped support ring having its outer lateral periphery attached to the bottom surface of said supporting structure around the edge of said opening and having its inner edge annularly engaging the bottom of said flange and supporting said housing; an outwardly refractive dispersing lens, convex outwardly and concave inwardly, disposed concentrically of said opening; a clamping ring mounted on the upper edge of said upstanding flange, said clamping ring engaging said lens and extending concentrically outwardly thereof; an annular lens support disposed peripherally of the inner face of said lens and attached to said clamping ring; means for attaching said clamping ring to said housing; a socket mounted in said housing; and a lamp with a small light source inserted in said socket with the center of its light source concentric with the center of curvature of the concave inward face of said lens.

References Cited in the file of this patent

UNITED STATES PATENTS

| | | |
|---|---|---|
| 960,926 | Hoops | June 7, 1910 |
| 1,793,227 | Evans | Feb. 17, 1931 |
| 1,922,618 | Dickson | Aug. 15, 1933 |
| 2,146,662 | Van Albada | Feb. 7, 1939 |
| 2,172,248 | Kost | Sept. 5, 1939 |
| 2,257,127 | Roper | Sept. 30, 1941 |
| 2,316,835 | Blood | Apr. 20, 1943 |
| 2,373,815 | Del Riccio | Apr. 17, 1945 |

FOREIGN PATENTS

| | | |
|---|---|---|
| 362,649 | Great Britain | Dec. 10, 1931 |
| 514,949 | Great Britain | Nov. 22, 1939 |